INVENTOR.
MILTON W. GREEN
BY John V. Regan
ATTORNEY

INVENTOR.
MILTON W. GREEN
BY John V. Regan
ATTORNEY 3,181,126
MEMORY SYSTEMS
Milton W. Green, Menlo Park, Calif., assignor to Radio Corporation of America, a corporation of Delaware
Filed July 10, 1959, Ser. No. 826,347
4 Claims. (Cl. 340—173.1)

This invention relates to memory systems, and particularly to memory systems using superconducting memory elements.

Elements of superconducting material can be used to store binary digital information signals. The two values of the digital signal are represented by the two polarities of current flow in the element.

One disadvantage with certain prior superconducting memory systems involves the problem of reading the stored information. During the reading operation, the initially stored information is changed or "destroyed," thereby requiring additional auxiliary circuitry for restoring or rewriting the original information. The restoring operation also introduces additional time delay in carrying out the reading operation.

It is an object of the present invention to provide improved memory systems of the superconducting type.

Another object of the present invention is to provide improved memory elements of the superconducting type wherein the stored information can be read-out non-destructively.

Still another object of the present invention is to provide improved superconducting memory systems which are relatively simple in construction and efficient in operation.

According to the present invention, each memory element includes a closed loop of superconducting material. A sensing conductor is positioned so as to be linked by the magnetic fields produced by current flow in the loop. Another conductor is also positioned near the sensing conductor. The sensing conductor is arranged so that it changes from one state to the other only for one direction of current flow in the loop.

In operation, a read signal of one polarity applied to the other conductor causes the sensing conductor to change from an initial state to the other state for one direction of current flow in the loop. The sensing conductor remains in the initial state for a loop current in the opposite direction. After removal of the read signal, the sensing conductor returns to the initial state. The changes in state of the sensing conductor do not alter the direction of the loop current. Hence, the read-out is non-destructive of the stored information.

Figures 1, 2, 3, 4, 5:
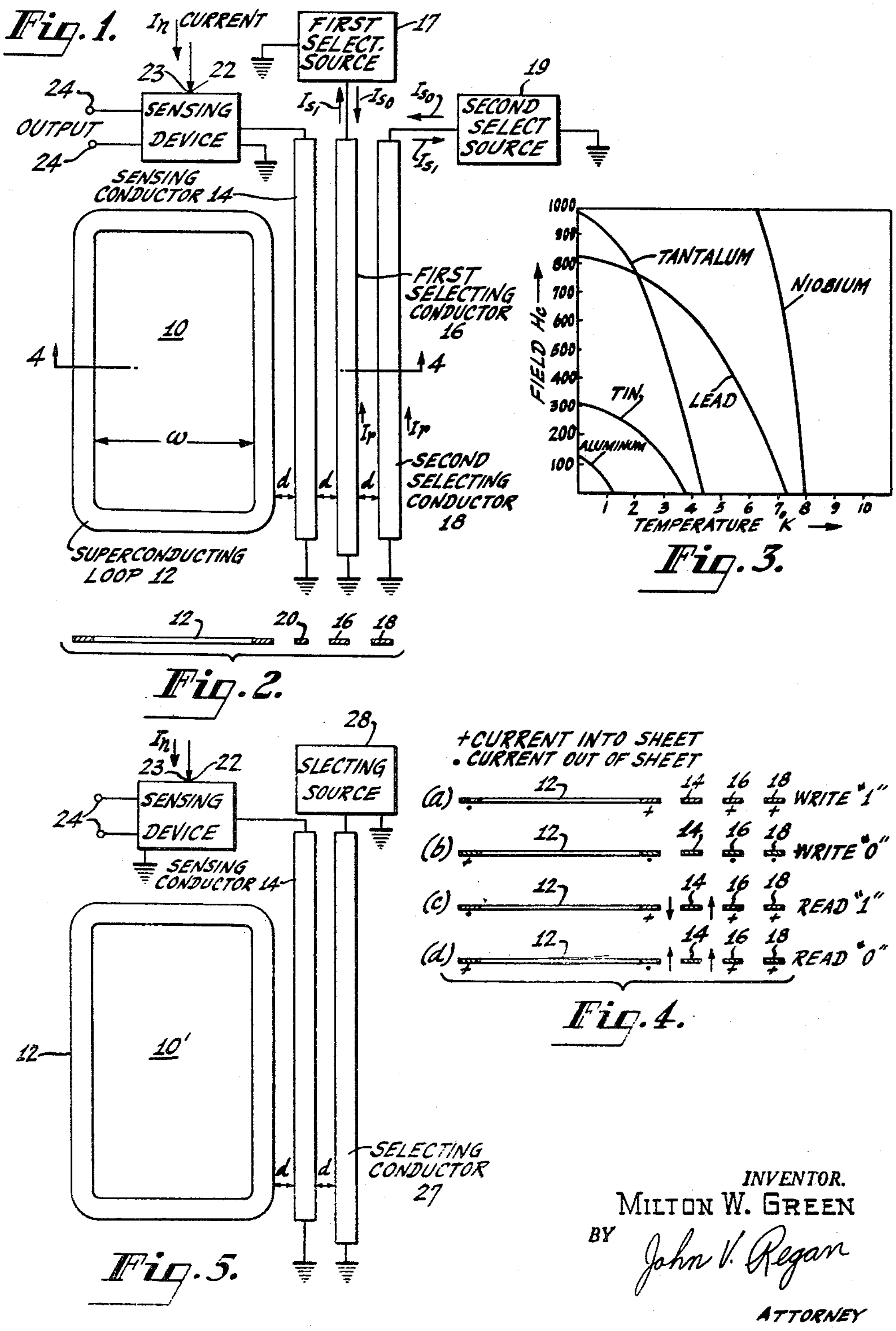
FIG. 1 is a schematic diagram of a memory system according to the invention using a pair of selecting conductors.
FIG. 2 is a schematic diagram in cross-section of a modified form of memory system according to the invention.
FIG. 3 is a graph showing representative curves of critical magnetic field Hc versus temperature in degrees Kelvin for various superconducting materials.
FIG. 4 is a set of cross-sectional diagrams, taken along the line 4—4 of FIG. 1, and useful in explaining the operation of the system of FIG. 1.
FIG. 5 is a schematic diagram of a memory system according to the invention using a single selecting conductor.

The superconducting element 10 of FIG. 1 includes a closed loop 12 of superconducting material such as lead, tin, and so forth. The loop 12 is elongated along the length direction of FIG. 1 and has a width *w*. Placed in close proximity to the loop 12 is a sensing conductor 14, a first selecting conductor 16, and a second selecting conductor 18. For convenience of drawing, the loop 12 and its adjacent operating conductors are shown enlarged in FIG. 1 and each of the remaining figures. The selecting conductors 16 and 18 preferably have a higher critical field than the loop 12. The sensing conductor 14, however, in the exemplary embodiment, has a critical field Hc different from that of either the loop 12 or the selecting conductors 16 and 18. For example, the sensing conductor 14 may be of a material having a lower critical field than that of the selecting conductors 16 and 18 and the loop 12. The sensing conductor 14 may be of the same material as the loop 12 but of a smaller cross-sectional area than that of any portion of the loop 12, as shown for the sensing conductor 20 of FIG. 2. The smaller cross-sectional area operates to reduce the critical field of the sensing conductor below that of the loop 12.

Representative curves of the critical field Hc for tantalum, lead, and niobium, respectively are shown in FIG. 3. Each of the curves of FIG. 3 corresponds to the transition region between the superconducting and resistive states for the given superconducting material. At any point above a particular curve, the corresponding material is in a resistive state, and at any point beneath the same curve the material is in the superconducting state.

Thus, for example lead (Pb) may be used for the loop 12. The selecting conductors 16 and 18 may be made of niobium, and tantalum (Tl) may be used for the sensing conductor 14. In such case, the sensing conductor 14 has a critical field lower than that of the loop 12 and selecting conductors 16 and 18. As described more fully hereinafter, the sensing conductor 14 (FIG. 1) or 20 (FIG. 2) is normally in the superconducting condition during operation of the memory system.

The sensing conductor 14 is positioned so as to be linked by the magnetic fields generated by current flows in the loop 12. The sensing conductor 14, and the first and second selecting conductors 16 and 18 are successively located at distances *d*, 2*d*, and 3*d* from the near edge of the loop 12, for reasons described more fully hereinafter. The distance *d* is made small compared to the width *w* of the loop 12, say, for example, the value of *d* may be one-tenth the value of *w*. The first and second selecting conductors 16 and 18 are connected to first and second selecting sources 17 and 19, respectively. Preferably, the selecting sources 17 and 19 are of the constant current type. The sensing conductor 14 is connected to one input of a sensing device 22. The sensing device 22 may have a second input 23 and a pair of output terminals 24. A common point of reference potential, indicated in the drawings by the conventional ground symbol also is provided.

The memory system of FIG. 1 and each of the other memory systems described hereinafter are operated in a suitable low temperature environment to permit the desired superconducting conditions of the elements to exist. For example, a suitable environment is liquid helium maintained at about 4.2° Kelvin in known manner. Preferably, the selecting conductors are always superconducting. The loops 12 also are superconducting except when momentarily changed to the resistive state during a write operation, as described hereinafter.

Information is stored in the loop 12 in known fashion, as by applying suitable amplitude currents concurrently to the selecting conductors 16 and 18. A clockwise direction of current flow around the loop 12 is used to represent one of the binary digits "1" and "0," and a counterclockwise current flow is used to represent the other of the binary digits "1" and "0." For example, a binary "1" may be stored by concurrently applying to the selecting conductors 16 and 18 currents in the direction of the arrows $I_{s1}$. The two selecting currents $I_{s1}$ together generate a net magnetic field of sufficient amplitude to change the loop 12 from the superconducting state to the resistive state. Upon termination of the selecting currents $I_{s1}$ a counterclockwise current flows in the loop 12, as indicated at line *a* of FIG. 4. Note that a single selecting current $I_{s1}$, however, generates a magnetic field of insufficient amplitude to change the loop 12 to the resistive state. Concurrent selecting currents $I_{s0}$, of opposite polarity from the currents $I_{s1}$, on termination, then store a binary "0" by causing a clockwise current flow in the loop 12, as indicated at line *b* of FIG. 4. In practice, the selecting current flowing in the second selecting conductor 18 may be made slightly larger in amplitude than the first conductor 16 selecting current to compensate for the increased spacing from the loop 12. The distance *w* across the loop 12 is sufficiently great so that the magnetic fields due to the selecting currents have a negligble effect on the side of the loop 12 remote from the selecting conductors 16 and 18. The elongation of the loop 12 provides for more efficient interaction between the loop 12 currents and the selecting currents.

During a read operation, a selecting current $I_r$ of one polarity, say in the polarity $I_{s1}$, is applied to each of the selecting conductors 16 and 18. The read selecting currents are of insufficient amplitude to change the loop 12 to the resistive state. Also, when a loop 12 current, say of amplitude I, is flowing in the clockwise direction, the read selecting current $I_r$ does not appreciably change the amplitude of the loop current. However, a counterclockwise loop 12 current of −I is somewhat reduced by an amount substantially proportional to $I_r$ multiplied by a factor which depends upon the geometry of the device buti n no case exceeds 0.5I. The failure to increase the loop 12 current I results because the two induced loop currents I and −I are made to be of maximum amplitude by using relatively large amplitude writing currents. The superconducting loop current amplitude normally changes in a direction tending to maintain a constant value of flux through the loop 12. Thus, if a selecting field is applied in a direction to aid the field due to the loop current, the loop current decreases; and conversely for an opposing selecting field. In practice, it is found, however, that if the loop current is already at a maximum value, it remains at this value even when an opposing field is applied, provided, however, that the opposing field is not of sufficient amplitude to cause the loop 12 to change to its resistive state, as in the case of the writing operation.

The two selecting read currents generate a net magnetic field which either aids or opposes the magnetic field generated by the loop 12 current in the region of the sensing conductor 14. When the selecting and loop fields oppose each other, the sensing conductor 14 remains in the normally superconducting state. When the selecting and loop fields aid each other, the sensing conductor 14 is changed from the superconducting to the resistive state.

Assume, for example, that a counterclockwise loop current, corresponding to a binary "1," is flowing in the loop 12, as represented by line *c* of FIG. 4. The magnetic field generated by the loop 12 current alone is of insufficient amplitude to change the sensing conductor 14 to its resistive state. Also, the magnetic fields due to the clockwise loop current and the net selecting field in the $I_r$ direction oppose each other in the region of the sensing conductor 14, as indicated by the two arrows. Since the loop 12 and selecting fields are opposed, the sensing conductor 14 remains in the superconducting state. The lack of change of state of the sensing conductor 14 is detected by the sensing device 22, which may be any suitable resistance measuring device. A current pulse $I_n$, applied to the second input 23 of the sensing device 22 finds the sensing conductor 14 either in the normal superconducting state or the resistive state during the read operation. In the case of the binary "1" signal, for example, the sensing conductor 14 remains superconducting. The sensing device 22 then applies a corresponding signal, indicating the presence of the binary "1," across the output terminals 24. After the output signal is generated, the read selecting currents are removed from the selecting conductors 16 and 18, and the sensing conductor 14 returns to the initial superconducting state.

Assume, now, that a clockwise current, corresponding to a binary "0," is flowing in the loop 12, as indicated at line *d* of FIG. 4. The read currents $I_r$ again apply the net magnetic field to the sensing conductor 14. However, the field generated by the read currents now is additive with the loop 12 field, as indicated by the arrows of line *d* of FIG. 4. Thus, the total field applied to the sensing conductor 14 now exceeds the critical value and the sensing conductor changes from the initial superconducting state to the resistive state. The sensing amplifier 22 then provides an output signal representative of the binary "0" stored in the loop 12 when the current $I_n$ is applied to its second input 23. After termination of the read currents, the sensing conductor 14 returns to the superconducting state.

Any suitable device may be used for the sensing device 22. For example, the sensing device 22 may be a cryoelectric device of the type described by Dudley A. Buck in Patent No. 2,832,897, issued April 29, 1958. In practice, the sensing device 22 may be arranged to provide a relatively large amplitude signal across the output terminals 24 each time a binary "0" is read from the storage element 10; and no output signal when a binary "1" is read.

As many successive read-outs of the stored information as desired can be performed without changing the information stored in the element 10.

In certain applications, a single selecting current may be used for reading out the stored information. In such case, a single selecting conductor 27 is placed adjacent the sensing conductor 14 as shown for the memory system 10' of FIG. 5. The conductor 27 is connected across a selecting source 28 arranged to apply suitable write and read currents to the conductor 27. The remaining elements of FIG. 5 are similar to those of FIG. 1.

The operation of the system of FIG. 5 is similar to that described for FIG. 1 except that the operating signals are applied only to the selecting conductor 27. During the read operation, the sensing device 22 provides the relatively large amplitude output signal only when the fields generated by the loop 12 current and the read selecting current are additive at the sensing conductor 14.

The systems of FIGS. 1 and 5 may be arranged to have the sensing conductor 14 normally in the resistive state by choosing an appropriate material. An appropriate material is one which has a critical field less than that produced by the loop 12 current. Thus, the loop 12 current then acts to maintain the sensing conductor 14 in the resistive state. During a read operation, the sensing conductor 14 is changed from its resistive to its superconducting state when the current used to read the stored information generates a field that is subtractive from the loop 12 field. Thus, the net field then applied to the sensing conductor 14 is less than the critical field and the sensing conductor changes to its superconducting state.

A plurality of the superconducting elements of FIG. 1 can be arranged in a coincident current memory system.

Figure 6:
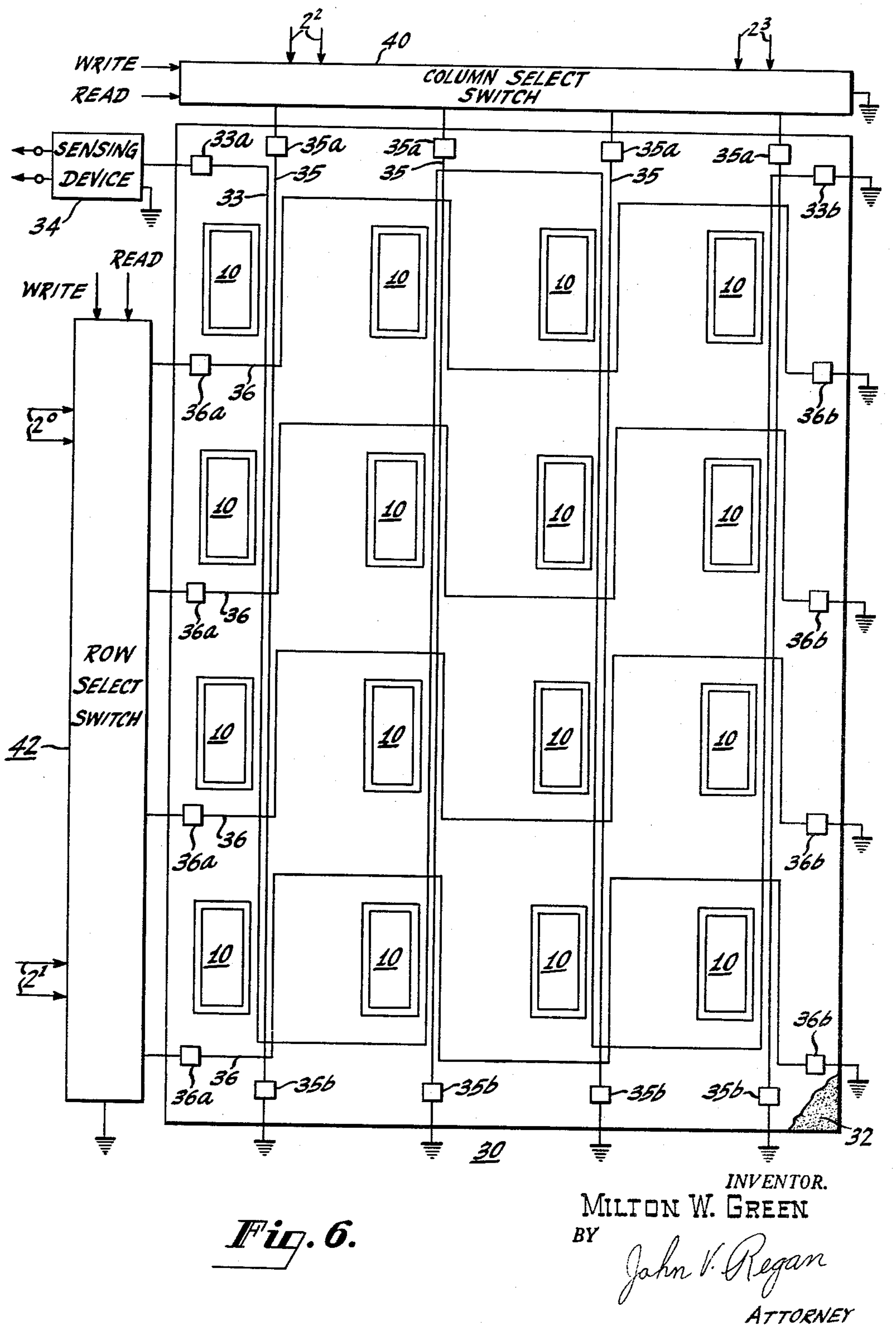
FIG. 6 is a schematic diagram of a memory system according to the invention using an array of memory elements.

For example, as shown in FIG. 6, a two-dimensional memory system 30 includes a 4 x 4 array of the elements 10. Each of the loops 12 of the elements 10 may be provided by printed circuit techniques, such as evaporation or plating, on a suitable substrate 32. Also, if desired, the elements 10 may be of foil material, such as lead foil or tin foil. A common sensing winding 33 is placed adjacent each of the loops 12 at the distance *d*. One end terminal 33*a* of the sensing winding 33 is connected to a sensing device 34 and the other sensing winding end terminal 33*b* is connected to ground. Four column conductors 35 are placed at the distance *d* from the sensing winding 33 along each different column of the array. Four row conductors 36 are placed at the distance *d* from each column conductor 35 along each different row of the array. The row and column conductors 36 and 35 are each placed on the same side, for example, the right-hand side, as viewed in the drawing, of the respective loops 12. Preferably, each of the operating conductors is placed adjacent the long side of a loop 12 in order to increase the efficiency of the system. As described above, increased efficiency results from the increased area of interaction of any loop 12 and its corresponding conductors. Thus, each row conductor 36 beginning at the left side of the array alternates between the bottom and right, and the top and right, sides of alternate loops 12 of a row. The sensing winding 33, the column conductors 35, and the row conductors 36, all may be deposited on the substrate 32 by suitable known printed circuit techniques. When the operating conductors are thus printed, suitable dielectric material (not indicated in the drawing) is used to electrically insulate each of the different conductors at the respective cross-over points.

The four column conductors 35 are connected respectively to four outputs of a column select switch 40. The four row conductors are connected respectively to four outputs of a row select switch 42. Each of the column conductors 35 and the row conductors 36 has one end terminal, remote from the column and row switches, connected to ground. A ground connection is also provided for each of the column and row select switches 40 and 42, and the sensing device 34.

In operation, the sensing conductor 33 is normally in the superconducting state. Information is written into a desired one of the elements 10 by operating the column and row switches 40 and 42 to apply concurrently selecting currents to the one selecting column and the one selecting row conductor 40 and 46 adjacent the desired element 10. Each of the column and row selecting currents, however, is limited in amplitude such that the critical field of any one of the unselected elements 10 is not exceeded. The sum of two selecting currents, however, does exceed the critical field of any loop 12 adjacent the two selecting conductors receiving both these currents. Accordingly, any non-selected element 10 receiving the magnetic field from only a single row or column selecting current, remains in the super-conducting condition. However, the desired element 10 receiving the resultant magnetic field from both row and column selecting currents changes from its normal superconducting condition to its resistive condition, unless the loop current already is in the desired direction. Upon termination of the column and row selecting currents, the desired element 10 is in the superconducting condition with the sense of current flow therein corresponding to that of the polarity of the selecting currents.

Any other storage element 10 may be selected in similar fashion for storing either a binary "1" or binary "0" digit.

During the read portion of a memory cycle, the information stored in a selected memory element 10 is read-out in the manner described above in connection with FIG. 1. Thus, a pair of read selecting currents $I_r$, of reduced amplitude from the writing currents, are applied to the column and row conductors 35 and 36 of the selected element 10. The sensing winding 33 changes to its resistive state only when the current flow in the selected element 10 is in the one polarity representing say, a binary "0" digit. The non-selected elements 10 along the selected column or row storing binary "0" digits do not produce any read-out signal because the single column or row current $I_r$ generates insufficient aiding magnetic field to change the respective portions of the sensing winding 33 adjacent these elements to the resistive state. The different portions of the sensing winding 33 adjacent non-selected elements 10 storing binary "1" digits also remain in the superconducting state due to the opposing field applied by the read selecting current. The sensing device 34 provides an output signal corresponding to the stored information of the selected element 10. As many successive read operations can be performed as desired without changing the stored information in the selected element 10 or any of the remaining elements 10.

Other arrangements of multi-dimensional memory systems may be provided according to the invention. Thus, separate sensing conductors may be used for each different column of elements 10 in the manner of the so-called word-organized memory systems. In such case, the information stored in a selected row of elements 10 is read-out at the same time to the separate sensing conductors by applying a suitable amplitude read signal to the row winding of the selected row in a three-dimensional array in a manner which will be apparent from what has been written hereinbefore.

There have been described herein improved memory systems using superconducting elements. Various arrangements have been described for obtaining non-destructive read-out of the information stored in the memory elements.

What is claimed is:

1. A memory system comprising a plurality of loops of superconducting material, a common sensing conductor adjacent to each of said loops, a first set of selecting conductors, each adjacent to a different first group of said loops, and a second set of selecting conductors, each adjacent a different second group of said loops, any one loop being common to one first and one second said group, and means for reading information stored in a desired one of said loops comprising means for applying a selecting current to said first and said second selecting conductors adjacent said one loop, wherein the said current flow around said one loop and said first and second selecting conductor currents together changing said common sensing conductor from its normal state to the opposite state for one direction of current flow in said one loop, and not changing said common sensing conductor from said normal state for the other direction of said loop current.

2. A memory system comprising an array of loops of superconducting material, said loops being arranged in rows and columns, a common sensing conductor located within the influence of a magnetic field generated by a current flow in any one of said loops, a plurality of row conductors each adjacent to the loops of a different said row, and a plurality of column conductors each adjacent the loops of a different said column, said sensing conductor being of superconducting material having a relatively high critical field so as to be normally in the superconducting condition, and means for reading information stored in a desired one of said loops comprising means for applying selecting currents to the said row and column conductors adjacent to said desired one loop, said loop field together with the fields generated by said row and column currents changing said sensing conductor from its superconducting state to the resistive state or not changing said common sensing conductor from the superconducting state in accordance with the information stored in said desired loop.

3. A memory system as recited in claim 1, including a substrate of non-conducting material, said loops and each of said conductors being printed on said substrate.

4. A memory system as recited in claim 1, including a sensing device connected across said sensing conductor.

References Cited by the Examiner

UNITED STATES PATENTS

| | | | |
|---|---|---|---|
| 2,856,596 | 10/58 | Miller | 340—166 |
| 2,877,448 | 3/59 | Nyberg | 340—173 |
| 2,914,735 | 11/59 | Young | 340—173 |
| 2,981,933 | 4/61 | Crowe et al. | 340—173.1 |
| 3,065,359 | 11/62 | Mackay | 340—173.1 |
| 3,082,408 | 3/63 | Garwin | 340—173.1 |
| 3,093,748 | 6/63 | Anderson | 340—173.1 |

OTHER REFERENCES

"A Review of Superconductive Switching Circuits," by Slade and McMahon, National Electronics Conference, vol. XIII, pp. 574–581, Oct. 7–9, 1957.

"A Cryotron Catalog Memory System," by Slade and McMahon, Proceedings of Eastern Joint Computer Conference, Dec. 10–12, 1956, pp. 115 to 120.

"Trapped-Flux Superconducting Memory," by Crowe, Proceedings 5th International Conference on Low Temperature Physics and Chemistry, Aug. 26–31, 1957, pp. 238 to 241.

"Trapped-Flux Superconducting Memory," by Crowe, IBM Journal, October 1957, pp. 295 to 302.

IRVING L. SRAGOW, *Primary Examiner.*

EVERETT R. REYNOLDS, *Examiner.*